F. LE R. SATTERLEE, Jr.
SUPPORT FOR X-RAY NEGATIVES.
APPLICATION FILED JUNE 3, 1914.
1,210,215.
Patented Dec. 26, 1916.
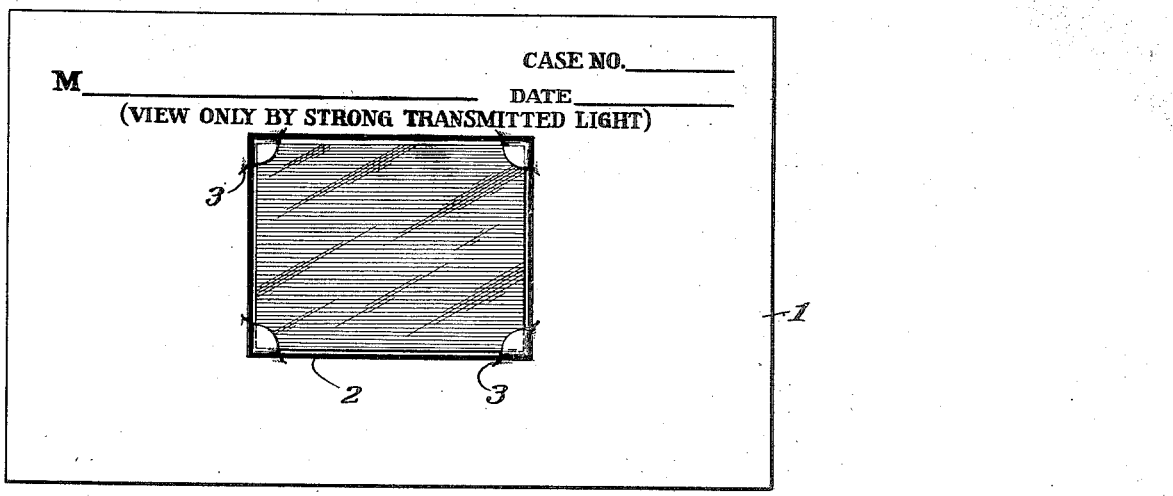

UNITED STATES PATENT OFFICE.

FRANCIS LE ROY SATTERLEE, JR., OF FLUSHING, NEW YORK.

SUPPORT FOR X-RAY NEGATIVES.

1,210,215.

Specification of Letters Patent.

Patented Dec. 26, 1916.

Application filed June 3, 1914. Serial No. 842,577.

*To all whom it may concern:*

Be it known that I, FRANCIS LE ROY SATTERLEE, Jr., a citizen of the United States, and a resident of Flushing, in the county of Queens and State of New York, have invented certain new and useful Improvements in Supports for X-Ray Negatives, of which the following is a specification.

This invention relates to the provision of means for facilitating the observation of negative films, and particularly what are popularly termed X-ray photographs or radiographs, and has for its object the elimination of superimposed images of surrounding objects from the image to be observed and the protection of the image-bearing surface of the negative film.

Incidentally the invention also affords means for keeping a record of the radiograph as well as permitting of the convenient filing of the same, and also permitting of the removal of one negative and the substitution of another upon a particular mount or support.

Heretofore it has been proposed to apply the image-bearing surface of the photographic plate, heretofore commonly used, upon a ground glass surface for the purpose of improving the print made therefrom and for facilitating retouching of the negative. The introduction moreover of a semi transparent surface or medium between two identical transparencies, the rear transparency being colored, has also been supplied in order to enhance the coloring effect of the rear transparency upon the front transparency.

My invention is distinct from the foregoing and is a distinctly new application of the principle of diffusion of light by means of a translucent body having a ground or roughened surface.

The invention is fully set forth in the following specification and drawing forming a part thereof, in which the figure shown is a plan view of the support embodying my invention.

Referring to the drawing, the reference numeral 1 designates a support, preferably of celluloid or other like flexible normally translucent medium or material, having at least one surface thereof which is a mat or dull surface. On said surface is printed the various data desired for the purpose of making a record of the radiograph to be mounted thereon, and also a rectangle or diagram 2 to indicate the position in which said radiograph is intended to be mounted. Suitable means, such as slits 3, are provided upon said mount for the reception of the said radiograph film, and preferably as shown the corners or the sides of said film are inserted in said slits in the well known manner employed in mounting photographs in an album, but the said films may be pasted on or otherwise attached to said mount. In the employment of said support the radiograph or film to be viewed is applied thereto with the dull or image-bearing surface of the film in contact with the dull side of the mount as thereby the opposite or glossy side of said mount or support is less likely to become scraped or otherwise marred, than were the case were the dull side or mat surface of said support not in contact with said film but exposed. Similarly, since the dull or image-bearing surface of the radiograph film is in contact with the dull or mat surface of said mount or support, said image-bearing surface of the radiograph film is protected against being marred by handling or otherwise, since the glossy or unsensitized radiograph film is likewise relatively unaffected by handling and not easily scraped or marred. Moreover, since it is desirable to print records upon the dull or mat surface of the support, it is obvious that the records may be observed while the film is being observed without reversing the film from the right and left position, as would be the case were the mount reversed in order to permit of observation of the glossy side thereof and observation of any records occurring thereon.

The aforesaid invention is particularly adapted for what are know as dental radiograph negatives, although the same may be obviously employed with larger X-ray negative films, since the films are commonly relatively small and difficult to handle and examine unless some convenient and effective means, such as herein described, is provided. When such radiographs are viewed from a source of light in the rear of the mount or support, the details of the image of said radiograph are easily observed since any image from the light or surrounding object is diffused and substantially eliminated.

Having thus described my invention, what I claim and desire to secure by Letters Patent is:—

The combination with a translucent celluloid support having a dull mat surface and a glossy surface, of a radiograph negative flexible celluloid film having an image-bearing surface and a glossy surface, the said dull mat surface of the support and the image-bearing surface of the radiograph negative being in contact, means lying substantially distant from the margin of said support for holding the said support and negative thus in contact and suitable indicia intermediate said retaining means and the margin of said support, adapted to serve as a suitable record of the negative secured to said support.

Signed at New York city in the county of New York and State of New York this 29th day of May, 1914.

FRANCIS LE ROY SATTERLEE, JR.

Witnesses:
HELEN BRADLEY,
ANNIE SHEA.